United States Patent
Yamaguchi et al.

(10) Patent No.: US 9,684,837 B2
(45) Date of Patent: Jun. 20, 2017

(54) SELF-LOCATION CALCULATING DEVICE AND SELF-LOCATION CALCULATING METHOD

(71) Applicant: Nissan Motor Co., Ltd., Yokohama-Shi, Kanagawa (JP)

(72) Inventors: Ichiro Yamaguchi, Kanagawa (JP); Hidekazu Nishiuchi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/120,795

(22) PCT Filed: Feb. 24, 2014

(86) PCT No.: PCT/JP2014/054315
§ 371 (c)(1),
(2) Date: Aug. 23, 2016

(87) PCT Pub. No.: WO2015/125299
PCT Pub. Date: Aug. 27, 2015

(65) Prior Publication Data
US 2017/0011269 A1    Jan. 12, 2017

(51) Int. Cl.
*G06K 9/00* (2006.01)
*B60W 40/11* (2012.01)
(Continued)

(52) U.S. Cl.
CPC .......... *G06K 9/00798* (2013.01); *B60K 31/00* (2013.01); *B60W 40/11* (2013.01);
(Continued)

(58) Field of Classification Search
CPC ........... G06K 9/00791; G06K 9/00798; G06K 9/00805
See application file for complete search history.

(56) References Cited

U.S. PATENT DOCUMENTS

| | | | |
|---|---|---|---|
| 6,285,778 B1 * | 9/2001 | Nakajima | G05D 1/0248 180/167 |
| 7,388,967 B2 * | 6/2008 | Ihara | G06K 9/00335 340/576 |

(Continued)

FOREIGN PATENT DOCUMENTS

| | | |
|---|---|---|
| JP | H06325298 A | 11/1994 |
| JP | 2004198211 A | 7/2004 |

(Continued)

OTHER PUBLICATIONS

R. I. Hartley, "A linear method for reconstruction from lines and points," Proc. 5th International Conference on computer Vision, Cambridge, Massachusetts, pp. 882-887 (1995).

(Continued)

*Primary Examiner* — Wesley Tucker
(74) *Attorney, Agent, or Firm* — Young Basile Hanlon & MacFarlane, P.C.

(57) ABSTRACT

A self-location calculating device projects a patterned light onto a road surface around a vehicle, as well as thereby captures and obtains an image of the road surface around the vehicle. Furthermore, the self-location calculating device detects a running condition of the vehicle. When it is determined that the vehicle is a running stable state, the self-location calculating device calculates a current position and a current attitude angle of the vehicle by adding an amount of change in an attitude to a predetermined initial attitude angle of the vehicle.

6 Claims, 10 Drawing Sheets

(51) Int. Cl.

| | |
|---|---|
| *B60W 40/112* | (2012.01) |
| *B60W 40/114* | (2012.01) |
| *B60K 31/00* | (2006.01) |
| *G01C 21/26* | (2006.01) |
| *G06K 9/20* | (2006.01) |
| *G01C 21/16* | (2006.01) |

(52) U.S. Cl.
CPC ......... *B60W 40/112* (2013.01); *B60W 40/114* (2013.01); *G01C 21/165* (2013.01); *G01C 21/26* (2013.01); *G06K 9/2036* (2013.01); *B60W 2420/42* (2013.01); *B60Y 2400/3015* (2013.01)

(56) References Cited

U.S. PATENT DOCUMENTS

| | | | |
|---|---|---|---|
| 7,561,180 B2 * | 7/2009 | Koike | B60Q 1/484 340/903 |
| 8,749,404 B2 * | 6/2014 | Augst | G06K 9/2036 340/436 |
| 9,349,058 B2 * | 5/2016 | Schamp | B60K 31/00 |
| 9,491,451 B2 * | 11/2016 | Pliefke | B60R 1/002 |
| 2005/0163343 A1 | 7/2005 | Kakinami et al. | |
| 2013/0182906 A1 | 7/2013 | Kojo et al. | |
| 2013/0243247 A1 * | 9/2013 | Sakaue | G01B 11/25 382/103 |
| 2015/0086078 A1 * | 3/2015 | Sibiryakov | G06T 3/4038 382/104 |
| 2015/0124238 A1 * | 5/2015 | Sakai | G01S 17/026 356/4.01 |
| 2015/0224926 A1 * | 8/2015 | Mochizuki | B60R 1/00 701/36 |
| 2015/0294161 A1 * | 10/2015 | Schamp | B60K 31/00 701/37 |
| 2016/0176343 A1 * | 6/2016 | Sakano | G06T 7/80 348/148 |
| 2017/0011268 A1 * | 1/2017 | Yamaguchi | G01C 21/28 |
| 2017/0024617 A1 * | 1/2017 | Yamaguchi | G01C 21/28 |
| 2017/0045889 A1 * | 2/2017 | Yamaguchi | G01C 21/28 |

FOREIGN PATENT DOCUMENTS

| | | |
|---|---|---|
| JP | 2004198212 A | 7/2004 |
| JP | 2007256090 A | 10/2007 |
| JP | 2008175717 A | 7/2008 |
| JP | 2010101683 A | 5/2010 |
| JP | 2013147114 A | 8/2013 |
| JP | 2013187862 A | 9/2013 |
| WO | 2012172870 A1 | 12/2012 |

OTHER PUBLICATIONS

D. G. Lowe, "Distinctive Image Features from Scale-Invariant Keypoints," Int. J. Comput. Vis., vol. 60, No. 2, pp. 31-110, Nov. 2004.

Yasushi Kanazawa, et al., "Detection of Feature Points for Computer Vision", IEICE Journal, Dec. 2004, pp. 1043-1048, vol. 87, No. 12.

* cited by examiner

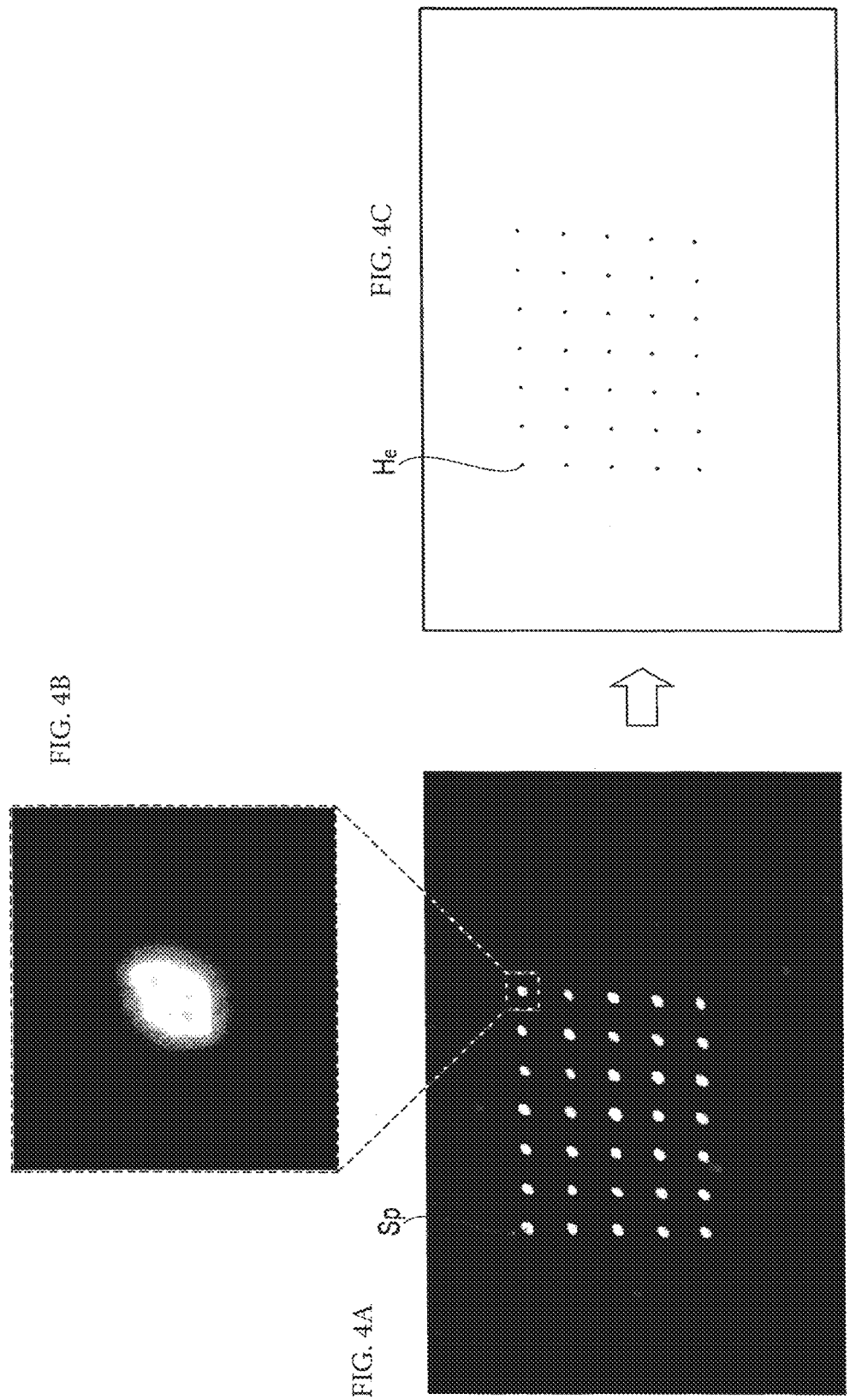

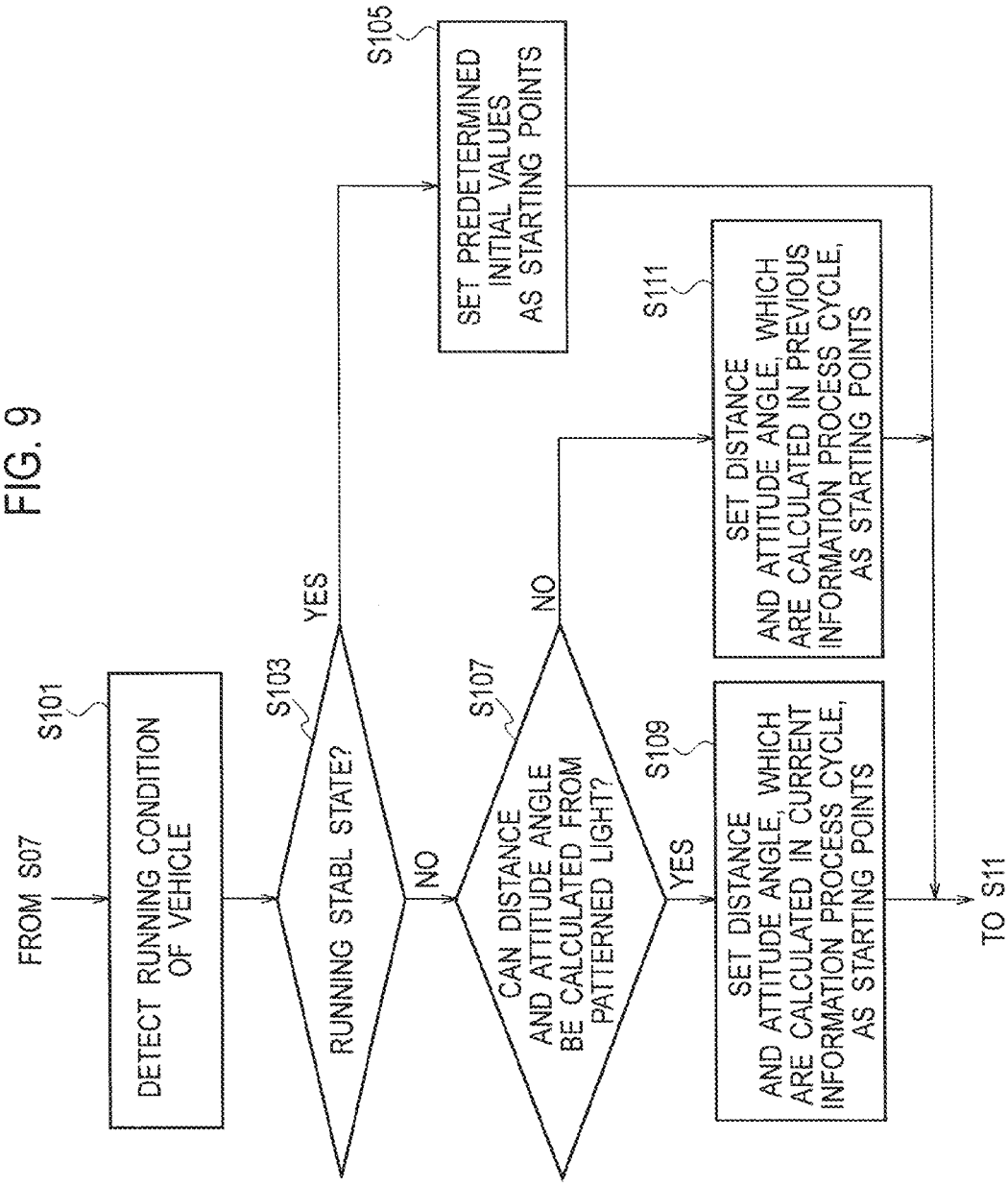

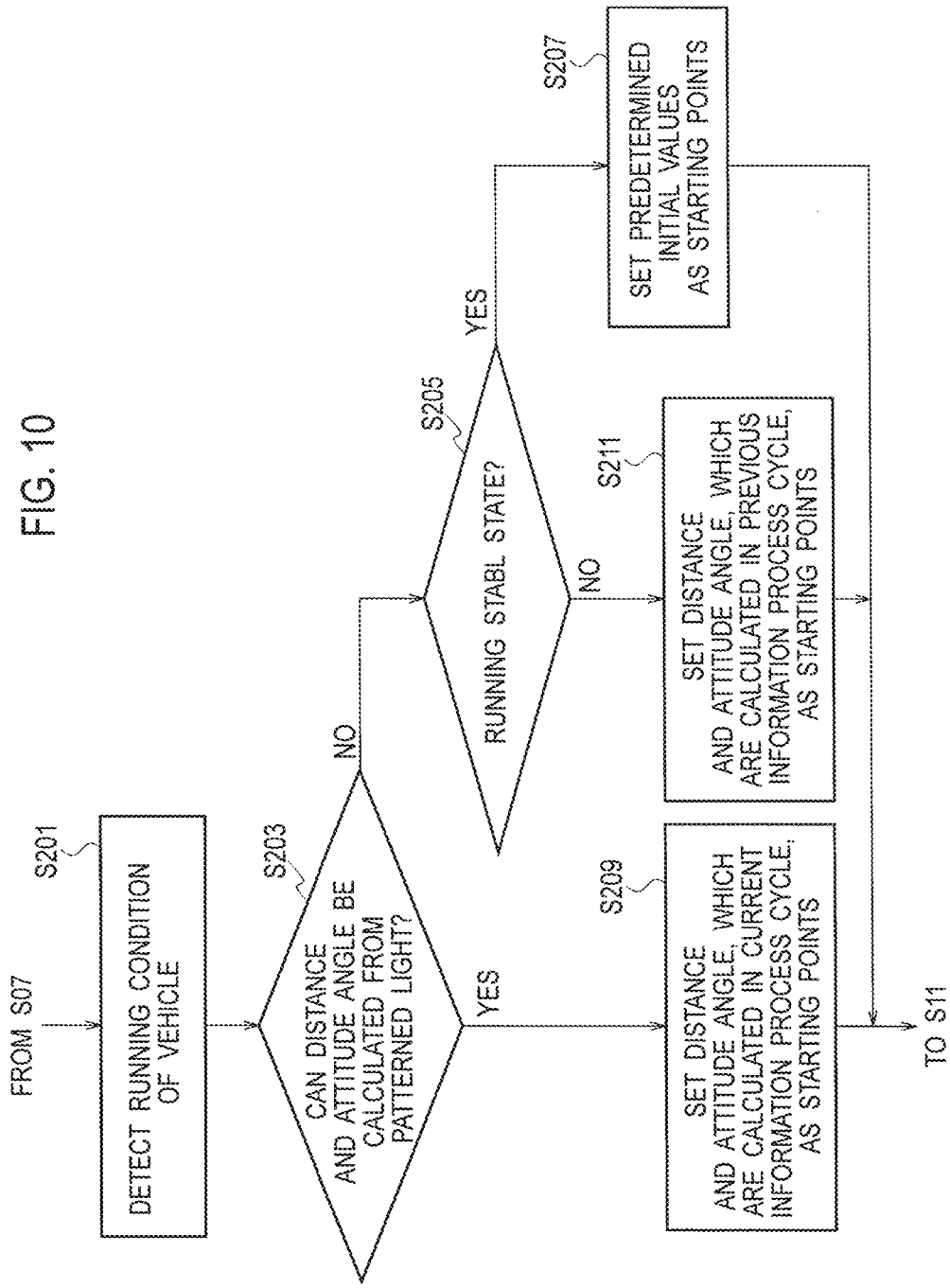

SELF-LOCATION CALCULATING DEVICE AND SELF-LOCATION CALCULATING METHOD

TECHNICAL FIELD

The present invention relates to a self-location calculating device and a self-location calculating method.

BACKGROUND

A technology has been known in which: cameras installed in a vehicle capture and obtain images of surroundings of the vehicle; and an amount of movement of the vehicle is obtained based on changes in the images (see Japanese Patent Application Publication No. 2008-175717). Japanese Patent Application Publication No. 2008-175717 aims at obtaining the amount of movement of the vehicle accurately even if the vehicle moves slightly at slow-speed. To this end, a feature point is detected from each image; the position of the feature point is obtained; and thereby, the amount of movement of the vehicle is obtained from the direction and distance of movement (amount of movement) of the feature point.

The above-mentioned conventional technique, however, has a problem that the amount of movement of the vehicle cannot be accurately estimated if starting points for obtaining the amount of movement of the vehicle are reset while the behavior of the vehicle is unstable.

SUMMARY

Against this background, the present invention has been proposed with the foregoing situation taken into consideration. An object of the present invention is to provide a self-location calculating device and a self-location calculating method which are capable of accurately calculating a self-location of the vehicle by resetting the starting points for calculating the self-location of the vehicle while the behavior of the vehicle is stable.

For the purpose of solving the foregoing problem, the self-location calculating device of one aspect of the present invention captures and thus obtains an image of a road surface around a vehicle onto which a patterned light is projected, and calculates an attitude angle of the vehicle relative to the road surface from a position of the patterned light on the image. Then, the self-location calculating device calculates a current position and a current attitude angle of the vehicle by: calculating an amount of change in an attitude of the vehicle based on temporal changes in multiple feature points on the road surface on the obtained image; and adding the amount of change in the attitude to an initial position and the attitude angle of the vehicle. Thereafter, when it is determined that the vehicle is a running stable state, the self-location calculating device calculates the current position and the current attitude angle of the vehicle by adding the amount of change in the attitude to predetermined initial distance and initial attitude angle of the vehicle.

BRIEF DESCRIPTION OF THE DRAWINGS

FIGS. 4(a)-4(c) are diagrams showing an image of a patterned light which is obtained by applying a binarization process to an image obtained with the camera, with FIG. 4(a) being a diagram showing the entirety of the patterned light, FIG. 4(b) being a magnified diagram showing one spotlight, and FIG. 4(c) is a diagram showing a position of the center of gravity of spotlights;

FIG. 9 is a flow chart showing a detailed process procedure for step S09 in FIG. 8 to be performed by the self-location calculating device of the first embodiment; and FIG. 10 is a flow chart showing a detailed process procedure for step S09 in FIG. 8 to be performed by the self-location calculating device of a second embodiment.

DETAILED DESCRIPTION OF THE EMBODIMENTS

Figure 1:
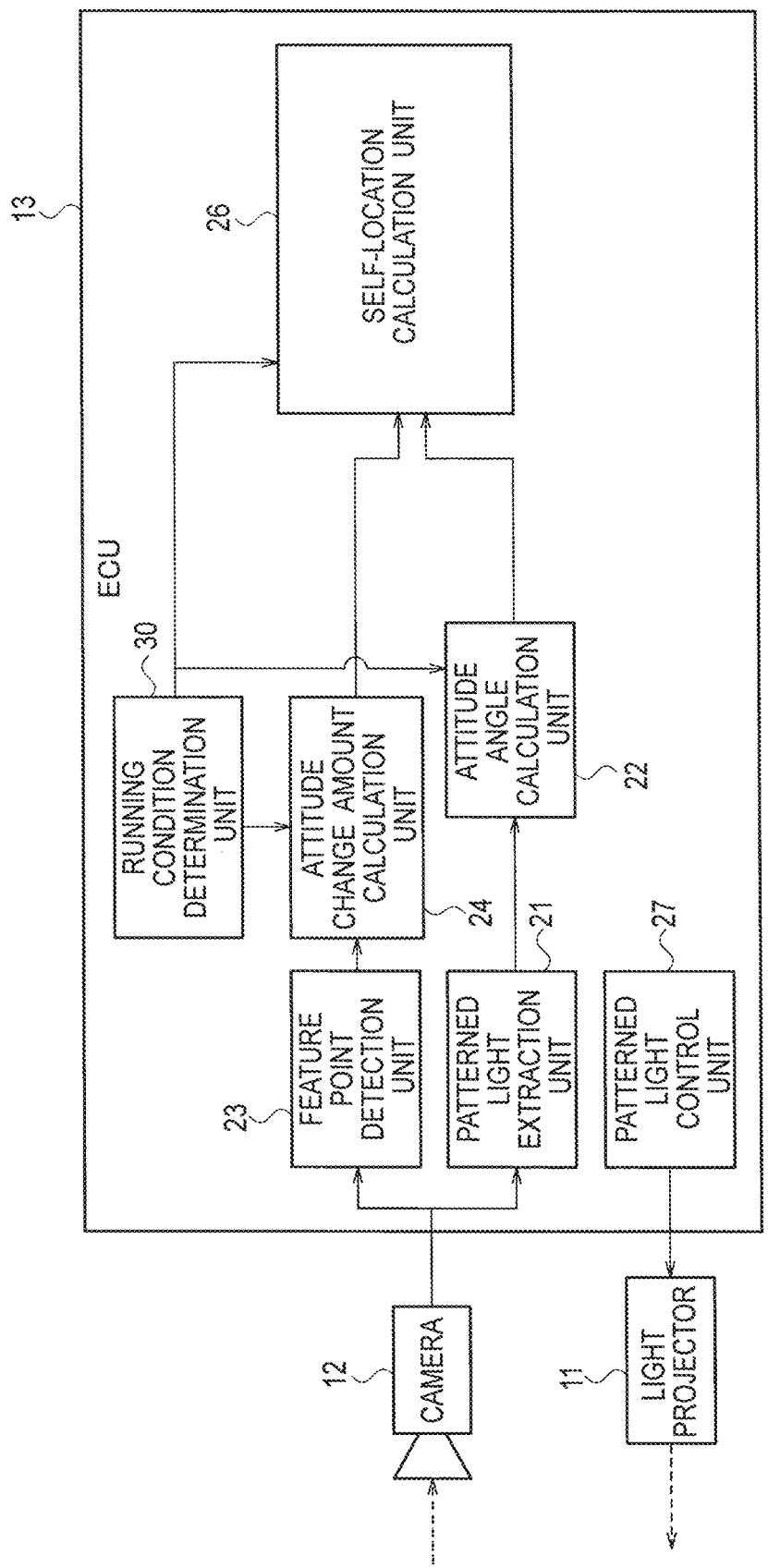
FIG. 1 is a block diagram showing an overall configuration of a self-location calculating device of a first embodiment.

Referring to the drawings, descriptions will be hereinbelow provided for first and second embodiments to which the present invention is applied.

First Embodiment

[Hardware Configuration]

To begin with, referring to FIG. 1, descriptions will be provided for a hardware configuration of a self-location calculating device of a first embodiment. The self-location calculating device includes a light projector 11, a camera 12 and an engine control unit (ECU) 13. The light projector 11 is installed in a vehicle, and projects a patterned light onto a road surface around the vehicle. The camera 12 is installed in the vehicle, and is an example of an image capturing unit configured to capture and thus obtain images of the road surface around the vehicle, inclusive of an area onto which the patterned light is projected. The ECU 13 is an example of a control unit configured to control the light projector 11, and to perform a series of information process cycles for calculating the self-location of the vehicle from images obtained by the camera 12.

Figure 2:
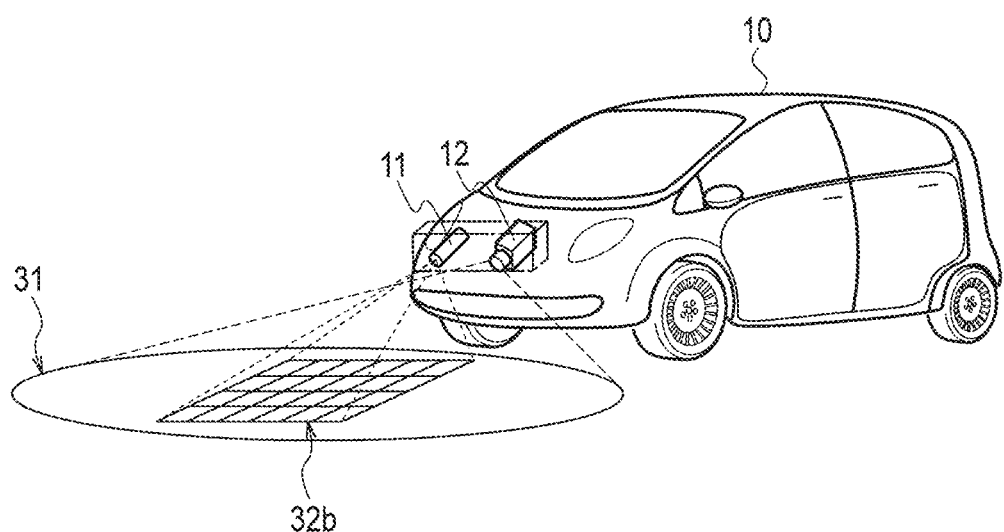
FIG. 2 is an external view showing an example of how a light projector and a camera are installed in a vehicle.

The camera 12 is a digital camera using a solid-state image sensor such as a CCD and a CMOS, and obtains digital images which are capable of image processing. What the camera 12 captures is the road surface around the vehicle. The road surface around the vehicle includes road surfaces in front of, in the back of, at sides of, and beneath the vehicle. As shown in FIG. 2, the camera 12 may be installed in a front section of the vehicle 10, more specifically above a front bumper, for example. The height at and direction in which the camera 12 is set are adjusted in a way that enables the camera 12 to capture images of feature points (textures) on the road surface 31 in front of the vehicle 10 and the patterned light 32b projected from the light projector 11. The focus and diaphragm of the lens of the camera 12 are automatically adjusted as well. The camera 12 repeatedly captures images at predetermined time intervals, and thereby obtains a series of image (frame) groups. Each time the camera 12 captures an image, image data obtained by the camera 12 is transferred to the ECU 13, and is stored in a memory included in the ECU 13.

Figure 3A:
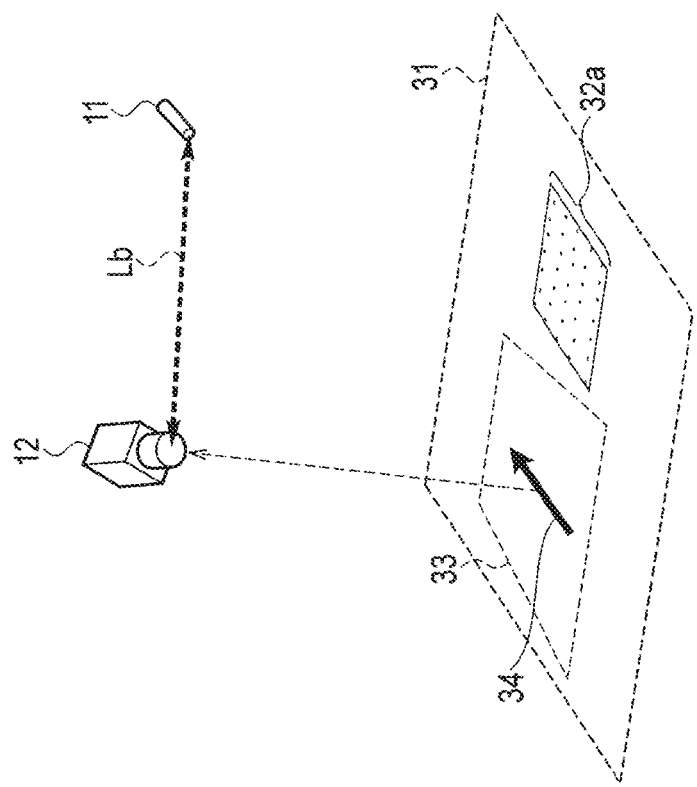
FIG. 3(a) is a diagram showing how a position of spot-lighted areas on a road surface is calculated by using the light projector and the camera.
Figure 3B:
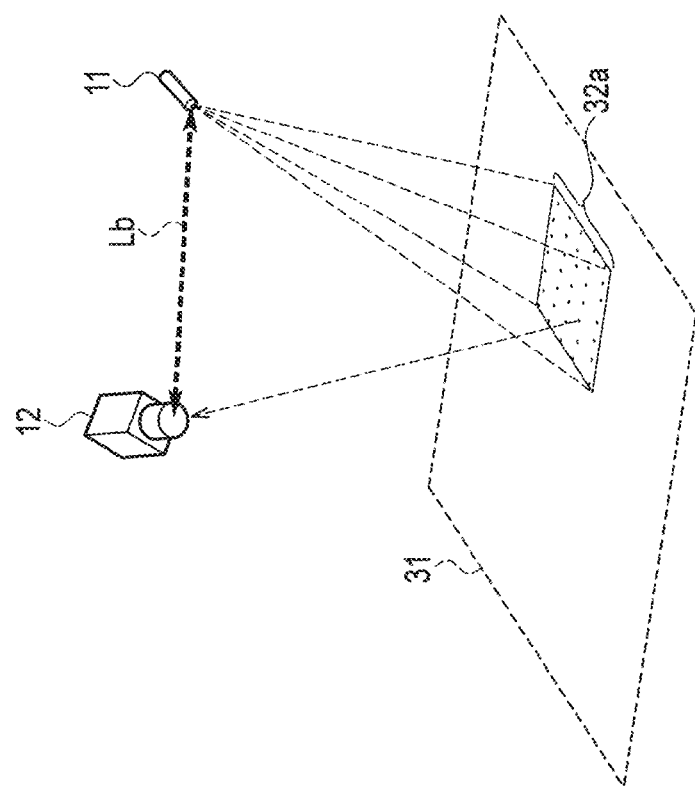
FIG. 3(b) is a diagram showing how a direction of movement of the camera is obtained from temporal changes in a feature point which is detected outside an area onto which a patterned light is projected.

As shown in FIG. 2, the light projector 11 projects the patterned light 32b having a predetermined shape, inclusive of a square or rectangular lattice image, onto the road surface 31 within an image capturing range of the camera 12. The camera 12 captures images of the patterned light projected onto the road surface 31. The light projector 11 includes a laser pointer and a diffraction grating, for example. The diffraction grating diffracts the laser beam projected from the laser pointer. Thereby, as shown in FIGS. 2 to 4, the light projector 11 generates the patterned light (32b, 32a) which includes multiple spotlights arranged in a lattice image or matrix pattern. In examples shown in FIGS. 3 and 4, the light projector 11 generates the patterned light 32a including 5×7 spotlights.

Returning to FIG. 1, the ECU 13 includes a CPU, a memory, and a microcontroller including an input-output section. By executing pre-installed computer programs, the ECU 13 forms multiple information processors which function as the self-location calculating device. For each image (frame), the ECU 13 repeatedly performs the series of information process cycles for calculating the self-location of the vehicle from images obtained by the camera 12. Incidentally, the ECU 13 may be also used as an ECU for controlling other systems of the vehicle 10.

In this respect, the multiple information processors include a patterned light extraction unit 21, an attitude angle calculation unit 22, a feature point detection unit 23, an attitude change amount calculation unit 24, a self-location calculation unit 26, a patterned light control unit 27 and a running condition determination unit 30. The attitude change amount calculation unit 24 includes the feature point detection unit 23.

The patterned light extraction unit 21 reads an image obtained by the camera 12 from the memory, and extracts the position of the patterned light from this image. For example, as shown in FIG. 3(a), the light projector 11 projects the patterned light 32a, which includes the multiple spotlights arranged in a matrix pattern, onto the road surface 31, while the camera 12 detects the patterned light 32a reflected off the road surface 31. The patterned light extraction unit 21 applies a binarization process to the image obtained by the camera 12, and thereby extracts only an image of the spotlights Sp, as shown in FIGS. 4(a) and 4(b). Thereafter, as shown in FIG. 4(c), the patterned light extraction unit 21 extracts the position of the patterned light 32a by calculating the center-of-gravity position He of each spotlight Sp, that is to say, the coordinates (Uj, Vj) of each spotlight Sp on the image. The coordinates are expressed using the number assigned to a corresponding pixel in the image sensor of the camera 12. In a case where the patterned light includes 5×7 spotlights Sp, "j" is a natural number not less than 1 but not greater than 35. The memory stores the coordinates (Uj, Vj) of the spotlight Sp on the image as data which indicates the position of the patterned light 32a.

The attitude angle calculation unit 22 reads the data which indicates the position of the patterned light 32a from the memory, and calculates the distance and attitude angle of the vehicle 10 relative to the road surface 31 from the position of the patterned light 32a on the image obtained by the camera 12. For example, as shown in FIG. 3(a), using the trigonometrical measurement principle, the attitude angle calculation unit 22 calculates the position of each spotlighted area on the road surface 31, as the relative position of the spotlighted area relative to the camera 12, from a base length Lb between the light projector 11 and the camera 12, as well as the coordinates (Uj, Vj) of each spotlight on the image. Thereafter, the attitude angle calculation unit 22 calculates a plane equation of the road surface 31 onto which the patterned light 32a is projected, that is to say, the distance and attitude angle (normal vector) of the camera 12 relative to the road surface 31, from the relative position of each spotlight relative to the camera 12.

It should be noted that in the embodiment, the distance and attitude angle of the camera 12 relative to the road surface 31 are calculated as an example of the distance and attitude angle of the vehicle 10 relative to the road surface 31 since the position of installation of the camera 12 in the vehicle 10 and the angle for the camera 12 to capture images are already known. In other words, the distance between the road surface 31 and the vehicle 10, as well as the attitude angle of the vehicle 10 relative to the road surface 31 can be obtained by calculating the distance and attitude angle of the camera 12 relative to the road surface 31.

To put it specifically, since the camera 12 and the light projector 11 are fixed to the vehicle 10, the direction in which the patterned light 32a is projected and the distance (the base length Lb) between the camera 12 and the light projector 11 are already known. For this reason, using the trigonometrical measurement principle, the attitude angle calculation unit 22 is capable of obtaining the position of each spotlighted area on the road surface 31, as the relative position (Xj, Yj, Zj) relative to the camera 12, from the coordinates (Uj, Vj) of each spotlight on the image. Hereinafter, the distance and attitude angle of the camera 12 relative to the road surface 31 will be referred to as "distance and attitude angle." The distance and attitude angle calculated by the attitude angle calculation unit 22 are stored into the memory.

It should be noted that, in many cases, the relative position (Xj, Yj, Zj) of each spotlight relative to the camera 12 is not present on the same plane. This is because the relative position of each spotlight changes according to the unevenness of the asphalt of the road surface 31. For this reason, the method of least squares may be used to obtain a plane equation which makes the sum of squares of distance error of each spotlight becomes least. Data on the thus-calculated distance and attitude angle is used by the self-location calculation unit 26 shown in FIG. 1.

The feature point detection unit 23 reads the image obtained by the camera 12 from the memory, and detects feature points on the road surface 31 from the image read from the memory. In order to detect the feature points on the road surface 31, the feature point detection unit 23 may use a method described in "D. G. Lowe, "Distinctive Image Features from Scale-Invariant Keypoints," Int. J. Comput. Vis., vol. 60, no. 2, pp. 91-110, November 200." Otherwise, the feature point detection unit 23 may use a method described in "Kanazawa Yasushi, Kanatani Kenichi, "Detection of Feature Points for Computer Vision," IEICE Journal, vol. 87, no. 12, pp. 1043-1048, December 2004."

Figure 6A:
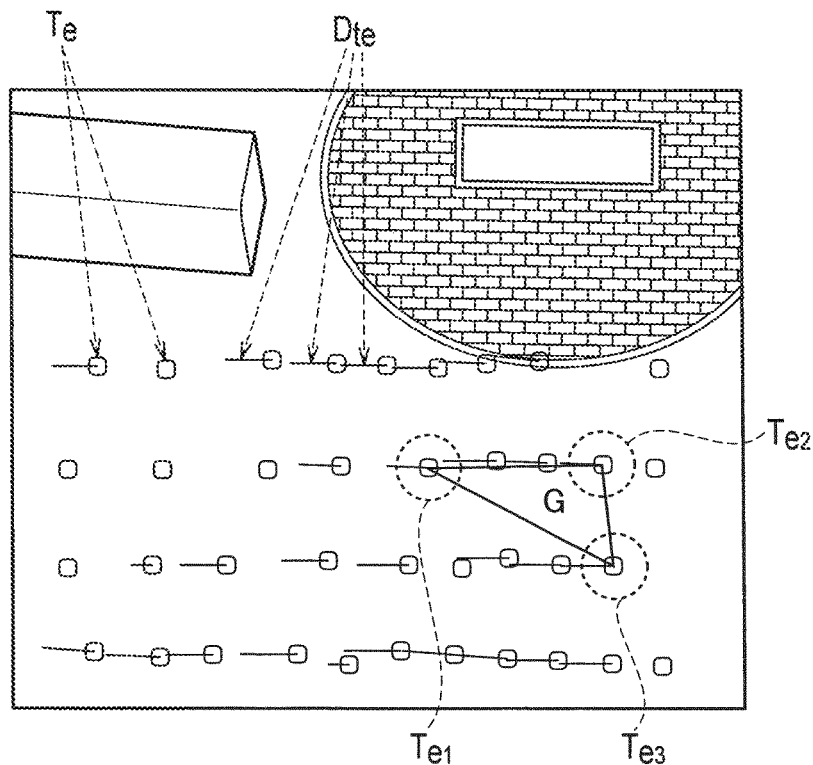
FIGS. 6(a) and 6(b) are diagrams showing feature points detected on the image, with FIG. 6(a) being a diagram showing a first frame (image) obtained at time t and FIG. 6(b) being a diagram showing a second frame obtained at time t+Δt.
Figure 6B:
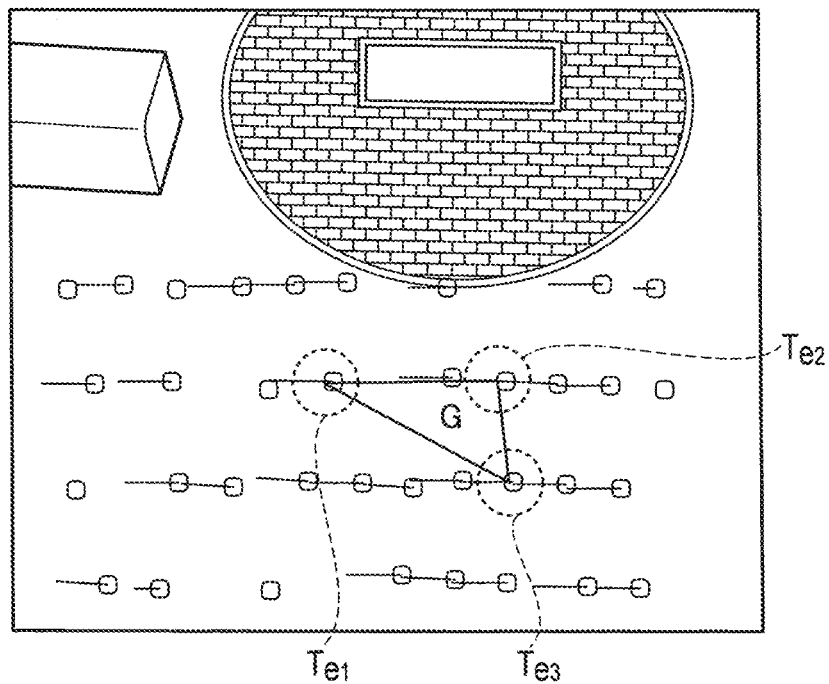

To put it specifically, for example, the feature point detection unit 23 uses the Harris operator or the SUSAN operator, and detects points, such as apexes of an object, the luminance values of which are largely different from the vicinities of the points as the feature points. Instead, however, the feature point detection unit 23 may use a SIFT (Scale-Invariant Feature Transform) feature amount so that points around which the luminance values change with certain regularity are detected as the feature points. And the feature point detection unit 23 counts the total number N of feature points detected from one image, and assigns identification numbers (i ($1 \leq i \leq N$)) to the respective feature points. The position (Ui, Vi) of each feature point on the image are stored in the memory inside the ECU 13. FIGS. 6(*a*) and 6(*b*) each shows examples of the feature points Te which are detected from the image captured by the camera 12. Furthermore, directions of changes of each feature point Te and amounts of changes in each feature point Te are expressed with vectors Dte.

It should be noted that in the embodiment, particles of asphalt mixture with a particle size of not less than 1 cm but not greater than 2 cm are assumed as the feature points on the road surface 31. The camera 12 employs the VGA resolution mode (approximate 300 thousand pixels) in order to detect the feature points. In addition, the distance from the camera 12 relative to the road surface 31 is approximately 70 cm. Moreover, the direction in which the camera 12 captures images is tilted at approximately 45 degrees to the road surface 31 from the horizontal plane. What is more, the luminance value of each image captured by the camera 12 and thereafter sent to the ECU 13 is within a range of 0 to 255 (0: darkest, 255: brightest).

The attitude change amount calculation unit 24 reads, from the memory, the positional coordinates (Ui, Vi) of the multiple feature points on an image included in an image of previous frame (at time t) which is among the image of flames captured at each certain information process cycle. Furthermore, the attitude change amount calculation unit 24 reads, from the memory, the positional coordinates (Ui, Vi) of the multiple feature points on the image included in an image of current frame (at time t+$\Delta$t). Thereafter, based on the temporal changes in the positions of the multiple feature points on the image, the attitude change amount calculation unit 24 obtains an amount of change in the attitude of the vehicle. In this respect, "the amount of change in the attitude of the vehicle" includes both "amounts of changes in the distance and attitude angle" of the vehicle relative to the road surface and an "amount of movement of the vehicle" on the road surface. Descriptions will be hereinbelow provided for how to calculate the "amounts of changes in the distance and attitude angle" and the "amount of movement of the vehicle."

Figure 5:
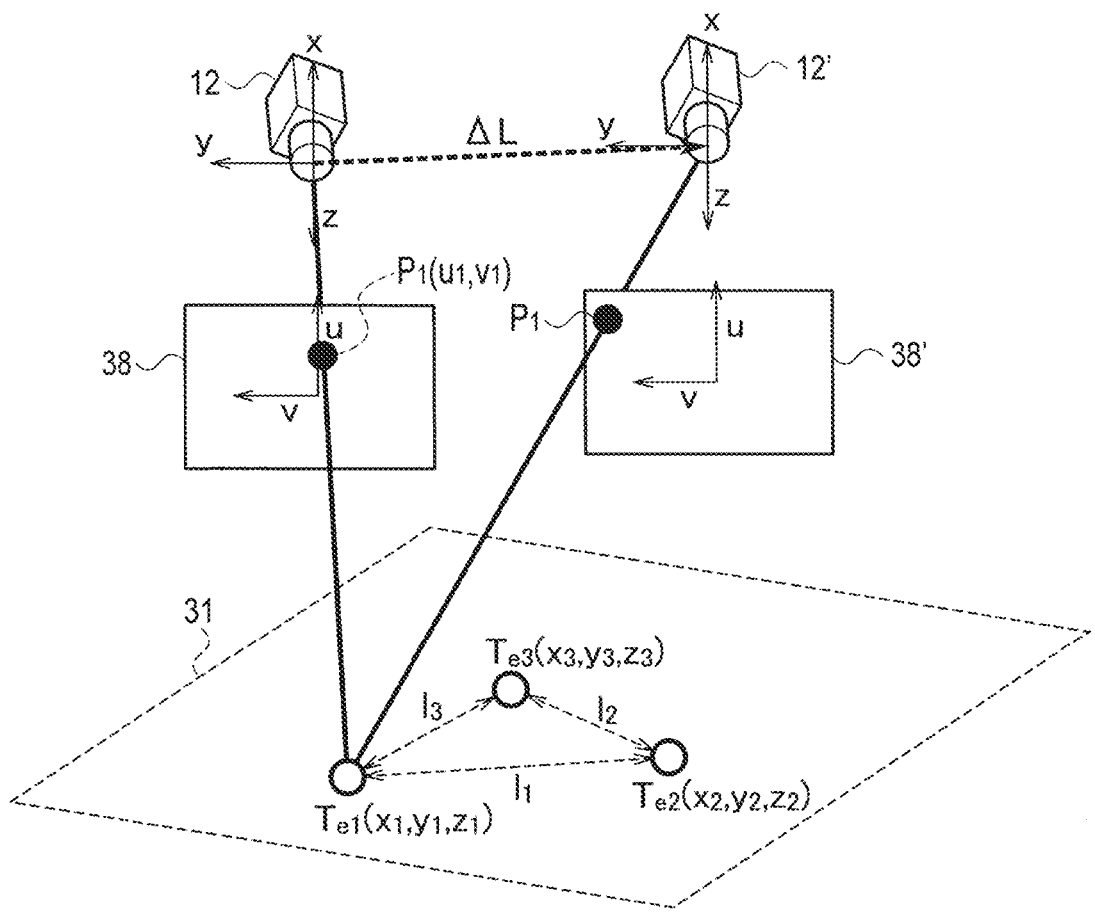
FIG. 5 is a schematic diagram for describing a method of calculating amounts of changes in a distance and attitude angle.

The amounts of changes in the distance and attitude angle can be obtained as follows, for example. FIG. 6(*a*) shows an example of a first frame (image) 38 (in FIG. 5) captured at time t. Let us assume a case where as shown in FIGS. 5 and 6(*a*), a relative position (Xi, Yi, Zi) of each of three feature points Te1, Te2, Te3 are calculated on the first frame 38, for example. In this case, a plane G (see FIG. 6(*a*)) identified by the feature points Te1, Te2, Te3 can be regarded as the road surface. Accordingly, the attitude change amount calculation unit 24 is capable of obtaining the distance and attitude angle (normal vector) of the camera 12 relative to the road surface (the plane G), from the relative position (Xi, Yi, Zi) of each of the feature points. Furthermore, from an already-known camera model, the attitude change amount calculation unit 24 is capable of obtaining a distance 11, 12, 13 between each feature point Te1, Te2, Te3, as well as an angle between straight lines joining each feature point Te1, Te2, Te3. The camera 12 in FIG. 5 shows the position of the camera when the first frame 38 is captured.

It should be noted that in FIG. 5, the three-dimensional coordinates (Xi, Yi, Zi) indicating the relative position of each feature point relative to the camera 12 are set in a way that: the Z-axis coincides with the direction in which the camera 12 captures the image; and the X and Y axes orthogonal to each other in a plane including the camera 12 are lines normal to the direction in which the camera 12 captures the image. Meanwhile, the coordinates on the image 38 are set such that: the V-axis coincides with the horizontal direction; and the U-axis coincides with the vertical direction.

FIG. 6(*b*) shows a second frame 38' obtained at time (t+$\Delta$t) where the time length $\Delta$t passed from time t. A camera 12' in FIG. 5 shows a position of the camera when the camera captures the second frame 38'. As shown in FIGS. 5 and 6(*b*), the camera 12' captures an image including the feature points Te1, Te2, Te3 in the second frame 38', and the feature point detection unit 23 detects the feature points Te1, Te2, Te3 from the image. In this case, the attitude change amount calculation unit 24 is capable of calculating an amount $\Delta$L of movement of the camera 12 at the interval of time $\Delta$t from: the relative position (Xi, Yi, Zi) of each of the feature points Te1, Te2, Te3 at time t; a position P1(Ui, Vi) of each feature point on the second frame 38'; and the camera model of the camera 12. Accordingly, the attitude change amount calculation unit 24 is capable of calculating the amount of movement of the vehicle. Furthermore, the attitude change amount calculation unit 24 is capable of calculating the amounts of changes in the distance and attitude angle as well. For example, the attitude change amount calculation unit 24 is capable of calculating the amount ($\Delta$L) of movement of the camera 12 (the vehicle) and the amounts of changes in the distance and attitude angle of the camera 12 (the vehicle) by solving the following system of simultaneous equations (1) to (4). Incidentally, the equation (1) mentioned below is based on an ideal pinhole camera free from strain and optical axial misalignment which is modeled after the camera 12, where $\lambda$i and f denote a constant and a focal length. The parameters of the camera model may be calibrated in advance.

[Equation (1)]

$$\lambda_i \begin{bmatrix} u_i \\ v_i \\ 1 \end{bmatrix} = \begin{bmatrix} f & 0 & 0 \\ 0 & f & 0 \\ 0 & 0 & 1 \end{bmatrix} \begin{bmatrix} x_i \\ y_i \\ z_i \end{bmatrix} \quad (1)$$

[Equation (2)]

$$(x_1 - x_2)^2 + (y_1 - y_2)^2 + (z_1 - z_2)^2 = l_1^2 \quad (2)$$

[Equation (3)]

$$(x_3 - x_2)^2 + (y_3 - y_2)^2 + (z_3 - z_2)^2 = l_2^2 \quad (3)$$

[Equation (4)]

$$(x_1 - x_3)^2 + (y_1 - y_3)^2 + (z_1 - z_3)^2 = l_3^2 \quad (4)$$

It should be noted that instead of using all the feature points whose relative positions are calculated in the images detected at time t and time t+Δt, the attitude change amount calculation unit 24 may select optimum feature points based on positional relationships among the feature points. An example of a selection method usable for this purpose is the epipolar geometry (the epipolar line geometry described in R. I. Hartley, "A linear method for reconstruction from lines and points," Proc. 5th International Conference on Computer Vision, Cambridge, Massachusetts, pp. 882-887 (1995)).

If like in this case, the feature points Te1, Te2, Te3, the relative positions of which on the frame image 38 at time t are calculated, are detected by the feature point detection unit 23 from the frame image 38' at time t+Δt as well, the attitude change amount calculation unit 24 is capable of calculating the "amount of change in the attitude angle of the vehicle" from the temporal changes in the relative positions (Xi, Yi, Zi) of the multiple feature points on the road surface and the temporal changes of the positions (Ui, Vi) of the feature points on the image. Furthermore, the attitude change amount calculation unit 24 is capable of calculating the amount of movement of the vehicle.

To put it specifically, if three or more feature points having correspondence relation between the previous frame and current frame can be detected continuously, the continuation of the process (integration operation) of adding the amounts of changes in the distance and attitude angle makes it possible to continuously update the distance and attitude angle without using the patterned light 32a. Nevertheless, the distance and attitude angle calculated using the patterned light 32a, or a predetermined initial distance and initial attitude angle, may be used for the first information process cycle. In other words, the distance and attitude angle which are starting points of the integration operation may be calculated using the patterned light 32a, or may be set at a predetermined initial distance and an initial attitude angle. It is desirable that the predetermined initial distance and the initial attitude angle are a distance and an attitude angle determined with at least the occupants and payload of the vehicle 10 taken into consideration. For example, the distance and attitude angle calculated using the patterned light 32a which is projected while the ignition switch of the vehicle 10 is on and when the shift position is moved from the parking position to another position may be used as the predetermined initial distance and the initial attitude angle. Thereby, it is possible to obtain the distance and attitude angle which is not affected by the roll movement or pitch movement of the vehicle 10 due to a turn, acceleration or deceleration of the vehicle 10.

It should be noted that the associating of the feature points in the current frame with the feature points in the previous frame may be achieved, for example, by: storing an image of a small area around each detected feature point into the memory; and for each feature point, making a determination from a similarity in luminance and color information. To put it specifically, the ECU 13 stores a 5(horizontal)×5(vertical)-pixel image around each detected feature point into the memory. If for example, the error in the luminance information having 20 or more pixels is equal to or less than 1%, the attitude change amount calculation unit 24 determines that the feature point in question correspond between the current and previous frames. Thereafter, the amount of change in the attitude obtained through the foregoing process is used by the self-location calculation unit 26 in the next process step to calculate the self-location of the vehicle.

The self-location calculation unit 26 calculates the current distance and current attitude angle of the vehicle 10 from the "amounts of changes in the distance and attitude angle" calculated by the attitude change amount calculation unit 24. In addition, the self-location calculation unit 26 calculates the self-location of the vehicle from the "amount of movement of the vehicle" calculated by the attitude change amount calculation unit 24.

Descriptions will be provided for how to perform the foregoing calculations in a specific case where the distance and attitude angle calculated by the attitude angle calculation unit 22 (that is to say, the distance and attitude angle calculated using the patterned light) are set as the starting points of the calculations. In this case, the self-location calculation unit 26 updates the distance and attitude angle with the most recent numerical values by sequentially adding (performing an integration operation on) the amounts of changes in the distance and attitude angle calculated for each frame by the attitude change amount calculation unit 24. In addition, the self-location calculation unit 26 calculates the self-location of the vehicle by: setting the position of the vehicle, which is obtained when the attitude angle calculation unit 22 calculates the distance and attitude angle, as the starting point (the initial position of the vehicle); and by sequentially adding (performing an integration operation on) the amount of movement of the vehicle from the initial position. For example, by setting the starting point (the initial position of the vehicle) which matches the position of the vehicle on a map, the self-location calculation unit 26 is capable of sequentially calculating the current self-location of the vehicle on the map.

Thereby, the attitude change amount calculation unit 24 is capable of calculating the self-location of the vehicle by obtaining the amount (ΔL) of movement of the camera 12 for the time length Δt. In addition, the attitude change amount calculation unit 24 is capable of calculating the amounts of changes in the distance and attitude angle at the same time. For these reasons, with the amounts of changes in the distance and attitude angle of the vehicle taken into consideration, the attitude change amount calculation unit 24 is capable of accurately calculating the amount (ΔL) of movement in six degrees of freedom (forward/rearward moving, leftward/rightward moving, upward/downward moving, yawing, pitching and rolling). In other words, an error in estimating the amount (ΔL) of movement can be minimized even if the distance and attitude angle are changed by the roll movement or pitch movement due to the turn, acceleration or deceleration of the vehicle 10.

In the embodiment, the amount (ΔL) of movement of the camera 12 is calculated by: calculating the amounts of changes in the distance and attitude angle; and updating the distance and attitude angle. Instead, however, the amount (ΔL) of movement of the camera 12 may be calculated by: calculating the amount of change in only the attitude angle of the camera 12 relative to the road surface 31; and updating only the attitude angle of the camera 12. In this case, it may be supposed that the distance between the road surface 31 and the camera 12 remains constant. This makes it possible to reduce the operation load on the ECU 13 while minimizing the error in estimating the amount (ΔL) of movement with the amount of change in the attitude angle taken into consideration, and to increase the operation speed of the ECU 13.

The patterned light control unit 27 controls the projection of the patterned light 32a by the light projector 11. For example, when the ignition switch of the vehicle 10 is turned on, and the self-location calculating device becomes activated, the patterned light control unit 27 starts to project the patterned light 32a at the same time. Thereafter, until the self-location calculating device stops its operation, the patterned light control unit 27 continues projecting the patterned light 32a. Otherwise, the patterned light control unit 27 may alternately turn on and off the light projection in predetermined intervals.

The running condition determination unit 30 detects a running condition of the vehicle 10, and determines whether or not the vehicle 10 is a running stable state. When the running condition determination unit 30 determines that the vehicle 10 is the running stable state, the self-location calculation unit 26 sets a position at which the vehicle 10 is the running stable state, as well as the predetermined initial distance and initial attitude angle, as the starting points for calculating the self-location. Thereby, the self-location calculation unit 26 calculates the current position of the vehicle 10 in present, as well as the current distance and attitude angle of the vehicle 10 in present relative to the road surface, by adding the amount of change in the attitude to the position at which the vehicle 10 is the running stable state, as well as the predetermined initial distance and initial attitude angle.

On the other hand, when determining that the vehicle 10 is not the running stable state, the running condition determination unit 30 determines whether or not the attitude angle calculation unit 22 calculates the distance and attitude angle of the vehicle 10 from the patterned light 32a in the current information process cycle. If the attitude angle calculation unit 22 calculates the distance and attitude angle of the vehicle 10, the self-location calculation unit 26 sets the current position of the vehicle 10, as well as the current distance and attitude angle of the vehicle 10 relative to the road surface, which are calculated in the current information process cycle, as the starting points for calculating the self-location.

If the attitude angle calculation unit 22 does not calculate the distance and attitude angle of the vehicle 10 in the current information process cycle, the self-location calculation unit 26 sets the current position of the vehicle 10, as well as the current distance and attitude angle of the vehicle 10 relative to the road surface, which are calculated in the previous information process cycle, as the starting points for calculating the self-location.

Here, descriptions will be provided for a method of determining whether or not the vehicle 10 is the running stable state. In the embodiment, the running condition determination unit 30 determines that the vehicle 10 is the running stable state when the vehicle 10 is under at least one of a condition that the vehicle 10 is at a stop, a condition that the speed of the vehicle 10 is constant, and a condition that the vehicle 10 is running straight.

The method of determining whether or not the vehicle 10 is at a stop is carried out such that if a wheel speed value measured by a wheel speed sensor installed in the vehicle 10 is at 0 (zero), the running condition determination unit 30 determines that the vehicle 10 is at a stop.

The method of determining whether or not the speed of the vehicle 10 is constant is carried out such that if an acceleration of the vehicle 10 in the front-rear direction detected by an acceleration sensor installed in the vehicle 10 is equal to or less than a threshold value, the running condition determination unit 30 determines that the speed of the vehicle 10 is constant. The threshold value is set at an acceleration Xg in the front-rear direction which makes a pitch angle of the vehicle 10 change by 0.01 [rad]≈0.57 [deg] compared with the stand-still condition of the vehicle 10. This makes it possible to limit an error in the calculation of the amount of movement of the vehicle 10 within 1%. Incidentally, in a case where no acceleration sensor is installed in the vehicle 10, the acceleration may be obtained by the differentiation of the value measured by the wheel speed sensor, or by the differentiation of the amount of movement of the vehicle 10, which is calculated by the attitude change amount calculation unit 24, with respect to time.

In addition, the method of determining whether or not the vehicle 10 is running straight is carried out such that if an acceleration of the vehicle 10 in the vehicle-width direction detected by an acceleration sensor installed in the vehicle 10 is equal to or less than a threshold value, the running condition determination unit 30 determines that the vehicle 10 is running straight. The threshold value is set at an acceleration Yg in the vehicle-width direction which makes a roll angle of the vehicle 10 change by 0.01 [rad]≈0.57 [deg] compared with the stand-still condition of the vehicle 10. This makes it possible to limit an error in the calculation of the amount of movement of the vehicle 10 within 1%.

It should be noted that a yaw rate γ [rad/s] (Yg≈V×γ) according to the vehicle speed V which makes the acceleration of the vehicle 10 in the vehicle-width direction equal to Yg may be used as the threshold value. Otherwise, a steering angle of the steering wheel may be used as the threshold value. Furthermore, in a case where no acceleration sensor or yaw rate sensor is installed in the vehicle 10, the acceleration may be obtained by the differentiation of the amount of movement, which is calculated by the attitude change amount calculation unit 24, with respect to time.

Once as described above, the running condition determination unit 30 determines that the vehicle 10 is the running stable state as a result of determining whether or not the vehicle 10 is the running stable state, the self-location calculation unit 26 calculates the current position of the vehicle 10 in present, as well as the current distance and attitude angle of the vehicle 10 in present relative to the road surface, by adding the amount of change in the attitude to the position at which the vehicle 10 is the running stable state, as well as the predetermined initial distance and initial attitude angle. In this respect, the distance and attitude angle of the vehicle 10 relative to the road surface at a time when the ignition switch of the vehicle 10 is turned on are used as the predetermined initial distance and initial attitude angle.

Figure 7:
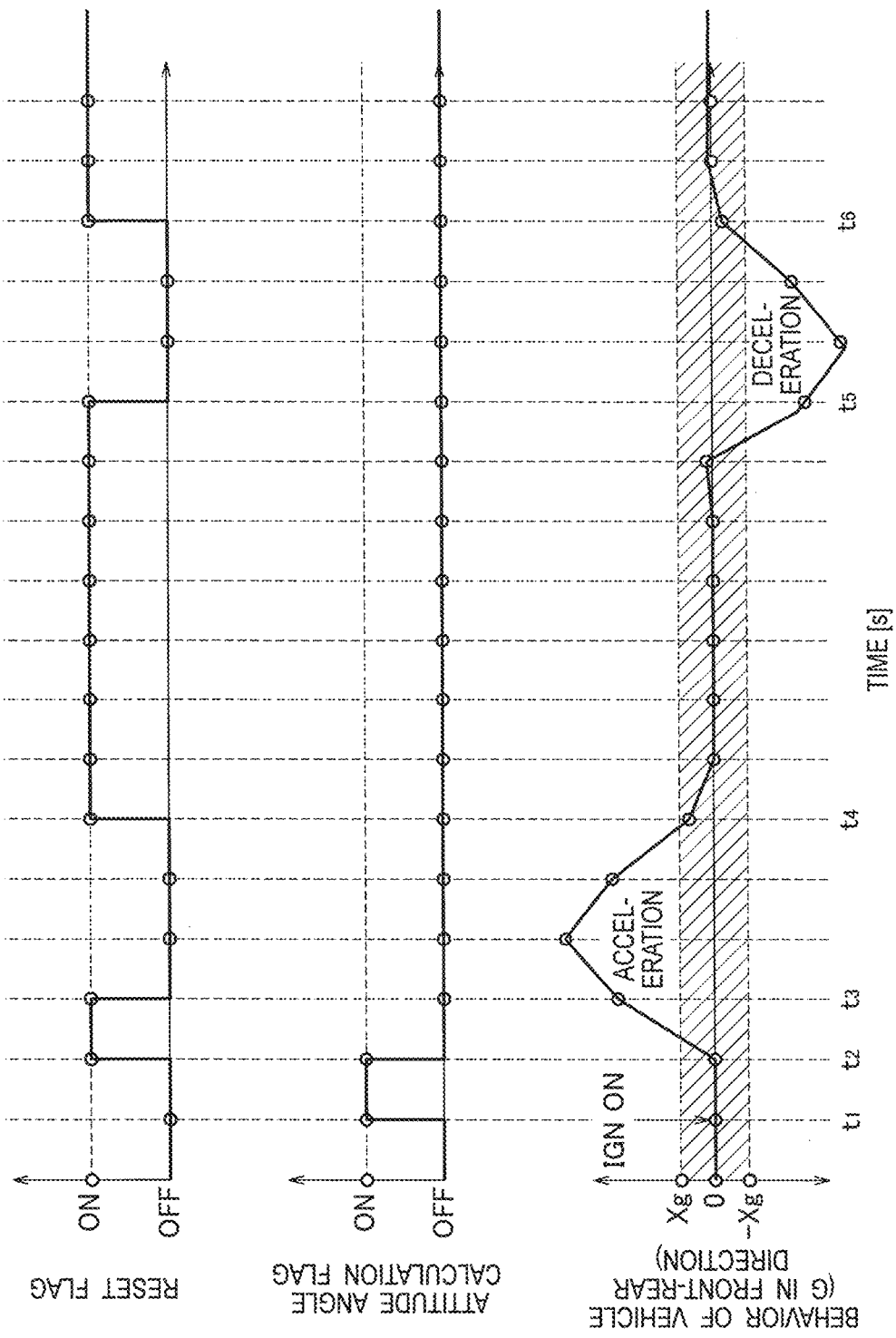
FIG. 7 is a time chart showing a process of resetting the distance and attitude angle of the vehicle to be performed by the self-location calculating device of the first embodiment depending on whether or not the vehicle is a running stable state.

Descriptions will be provided for a case where, for example, the running condition determination unit 30 is monitoring the acceleration of the vehicle 10 in the front-rear direction, as shown in FIG. 7. The threshold value is set at the acceleration Xg which makes the pitch angle change by 0.01 [rad]. In this case, once the ignition switch of the vehicle 10 is turned on at time t1, an attitude angle calculation flag is turned on. Thus, the patterned light 32a is projected at this timing. Furthermore, the attitude angle calculation unit 22 calculates the distance and attitude angle of the vehicle 10 from the position of the patterned light 32a, and stores a result of the calculation in the memory. Thereafter, at time t2, because the acceleration of the vehicle 10 in the front-rear direction is equal to or less than the threshold value Xg, the running condition determination unit 30 determines that the vehicle 10 is the running stable state, and sets a reset flag on. Accordingly, the self-location calculation unit 26 resets the starting points for calculating the self-location so that the predetermined initial distance and initial attitude angle, namely the current position of the vehicle 10 as well as the current distance and the current attitude angle of the vehicle 10 relative to the road surface at the time when the ignition switch is turned on, are used as the starting points.

At time t3, however, the acceleration of the vehicle 10 in the front-rear direction exceeds the threshold value Xg. For this reason, the running condition determination unit 30 determines that the vehicle 10 is not the running stable state, and sets the reset flag off. Thereby, the self-location calculation unit 26 stops using the predetermined initial distance and initial attitude angle as the starting points for calculating the self-location. Thereafter, at time t4, the acceleration of the vehicle 10 in the front-rear direction becomes equal to or less than the threshold value Xg again. For this reason, the running condition determination unit 30 determines that the vehicle 10 is the running stable state, and sets the reset flag on. Thus, the self-location calculation unit 26 starts using the predetermined initial distance and initial attitude angle as the starting points.

In the embodiment, as described above, when the running condition determination unit 30 determines that the vehicle 10 is the running stable state, the starting points for calculating the self-location are set at the predetermined initial distance and initial attitude angle. This makes it possible to reset the starting points for calculating the self-location of the vehicle 10 when the behavior of the vehicle 10 is stable, and to accordingly calculate the self-location of the vehicle 10 accurately.

[Information Process Cycle]

Figure 8:
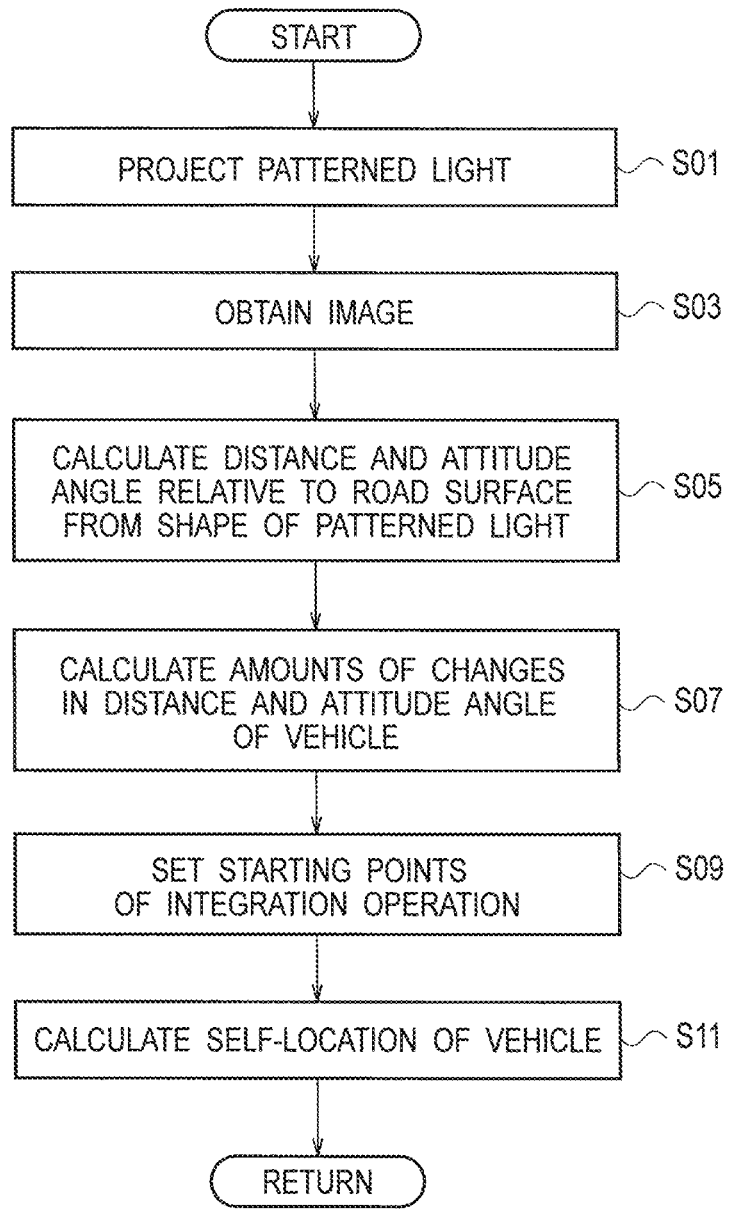
FIG. 8 is a flow chart showing a process procedure for a self-location calculating process to be performed by the self-location calculating device of the first embodiment.

Next, referring to FIGS. 8 and 9, descriptions will be provided for the information process cycle to be repeatedly performed by the ECU 13. The information process cycle is an example of a self-location calculating method of calculating the self-location of the vehicle 10 from the image 38 obtained by the camera 12.

The information process cycle shown in FIG. 8 is started at the same time as the self-location calculating device becomes activated after the ignition switch of the vehicle 10 is turned on, and is repeatedly performed until the self-location calculating device stops its operation.

In step S01 in FIG. 8, the patterned light control unit 27 controls the light projector 11 so as to project the patterned light 32a onto the road surface 31 around the vehicle.

Proceeding to step S03, the ECU 13 controls the camera 12 to obtain the image 38 by making the camera 12 shoot the road surface 31 around the vehicle 10, inclusive of an area onto which the patterned light 32a is projected. The ECU 13 stores the data on the image obtained by the camera 12 into the memory.

It should be noted that the ECU 13 is capable of automatically controlling the diaphragm of the camera 12. The ECU 13 may be configured to perform a feedback control of the diaphragm of the camera 12 in a way that makes a value of brightness of the image becomes equal to a median value between the maximum and minimum values in accordance with an average of the brightness of the image 38 obtained in the previous information process cycle. Otherwise, since the value of the brightness of the area onto which the patterned light 32a is projected is high, the ECU 13 may obtain an average value of the brightness from an area outside a part from which the patterned light 32a is extracted.

Proceeding to step S05, to begin with, the patterned light extraction unit 21 reads the image 38 obtained by the camera 12 from the memory, and extracts the position of the patterned light 32a from the image 38, as shown in FIG. 4(c). The patterned light extraction unit 21 stores the coordinates (Uj, Vj) of each spotlight Sp on the image, which are calculated as the data indicating the position of the patterned light 32a, into the memory.

Furthermore, in step S05, the attitude angle calculation unit 22 reads the data indicating the position of the patterned light 32a from the memory, calculates the distance and attitude angle of the vehicle 10 relative to the road surface 31 from the position of the patterned light 32a, and stores the thus-calculated distance and attitude angle into the memory.

Proceeding to step S07, the ECU 13 detects the feature points from the image 38, extracts the feature points which have correspondence relation between the previous and current information process cycles, and calculates the amounts of changes in the distance and attitude angle from the positions (Ui, Vi) of the respective extracted feature points on the image. In addition, the ECU 13 calculates the amount of movement of the vehicle.

To put it specifically, to begin with, the feature point detection unit 23 reads the image 38 obtained by the camera 12 from the memory, detects the feature points on the road surface 31 from the image 38, and stores the positions (Ui, Vi) of the respective feature points on the image into the memory.

The attitude change amount calculation unit 24 reads the positions (Ui, Vi) of the respective feature points on the image from the memory, and calculates the relative positions (Xi, Yi, Zi) of the feature points relative to the camera 12 from the distance and attitude angle which are calculated by the attitude angle calculation unit 22, as well as the positions (Ui, Vi) of the feature points on the image. Incidentally, the attitude change amount calculation unit 24 uses the distance and attitude angle which are set in step S09 in the previous information process cycle. Thereafter, the attitude change amount calculation unit 24 stores the relative positions (Xi, Yi, Zi) of the feature points relative to the camera 12 into the memory.

After that, the attitude change amount calculation unit 24 reads the positions (Ui, Vi) of the feature points on the image, and the relative positions (Xi, Yi, Zi) of the feature points calculated in step S07 in the previous information process cycle from the memory. The attitude change amount calculation unit 24 calculates the amounts of changes in the distance and attitude angle using: the relative positions (Xi, Yi, Zi) of the feature points which have correspondence relation between the previous and current information process cycles; and the positions (Ui, Vi) of the thus-corresponding feature points on the image. Furthermore, the attitude change amount calculation unit 24 calculates the amount of movement of the vehicle from the previous relative positions (Xi, Yi, Zi) of the feature points and the current relative positions (Xi, Yi, Zi) of the feature points, and stores the resultant amount of movement of the vehicle into the memory. The "amounts of changes in the distance and attitude angle" and the "amount of movement of the vehicle" which are calculated in step S07, are used for the process in step S11.

Proceeding to step S09, the ECU 13 sets the starting points of the integration operation for calculating the self-location according to the running conditions of the vehicle. Details will be later described referring to FIG. 9.

Proceeding to step S11, the self-location calculation unit 26 calculates the self-location of the vehicle 10 from: the starting points of the integration operation set in step S09; and the amounts of changes in the distance and attitude angle of the vehicle 10 calculated in the process in step S07.

Thus, the self-location calculating device of the embodiment is capable of calculating the self-location of the vehicle 10 by repeatedly performing the foregoing series of information process cycles to integrate the amount of movement of the vehicle 10.

[Process in Step S09]

Next, referring to a flow chart in FIG. 9, descriptions will be provided for a detailed procedure in step S09 in FIG. 8. As shown in FIG. 9, in step S101, the running condition determination unit 30 detects the running condition of the vehicle 10. To put it specifically, the running condition determination unit 30 detects the speed of the vehicle 10 using the wheel speed sensor, or detects the acceleration of the vehicle 10 in the front-rear direction or in the vehicle-width direction using the acceleration sensor. Otherwise, the running condition determination unit 30 may detect the yaw rate of the vehicle 10 using the yaw rate sensor.

Subsequently, in step S103, the running condition determination unit 30 determines whether or not the vehicle 10 is the running stable state. To put it specifically, when the vehicle 10 is at a stop, the running condition determination unit 30 determines that the vehicle 10 is the running stable state. In this case, if the value of the wheel speed measured by the wheel speed sensor installed in the vehicle 10 becomes equal to 0 (zero), the running condition determination unit 30 determines that the vehicle 10 is the running stable state by judging that the vehicle 10 comes to a stop.

Alternatively, when the speed of the vehicle 10 is constant, the running condition determination unit 30 determines that the vehicle 10 is the running stable state. In this case, if the acceleration of the vehicle 10 in the front-rear direction detected by the acceleration sensor installed in the vehicle 10 is equal to or less than the threshold value, the running condition determination unit 30 determines that the vehicle 10 is the running stable state by judging that the speed of the vehicle 10 is constant.

Otherwise, when the vehicle 10 is running straight, the running condition determination unit 30 determines that the vehicle 10 is the running stable state. In this case, if the acceleration of the vehicle 10 in the vehicle-width direction detected by the acceleration sensor installed in the vehicle 10 is equal to or less than the threshold value, the running condition determination unit 30 determines that the vehicle 10 is the running stable state by judging that the vehicle 10 is running straight.

As described above, when the running condition determination unit 30 determines that the vehicle 10 is the running stable state as a result of determining whether or not the vehicle 10 is the running stable state (if YES in step S103), the procedure proceeds to step S105. On the other hand, when the running condition determination unit 30 determines that the vehicle 10 is not the running stable state (if NO in step S103), the procedure proceeds to step S107.

In step S105, the self-location calculation unit 26 sets the predetermined initial distance and initial attitude angle as the starting points of the integration operation. In the embodiment, for example, the distance and attitude angle of the vehicle 10 relative to the road surface at the time when the ignition switch of the vehicle 10 is turned on are set as the predetermined initial distance and initial attitude angle.

In step S107, the running condition determination unit 30 determines whether or not the attitude angle calculation unit 22 calculates the distance and attitude angle from the patterned light 32a. If the attitude angle calculation unit 22 calculates the distance and attitude angle in step S05 in the current information process cycle (if YES in step S107), the procedure proceeds to step S109. On the other hand, if the attitude angle calculation unit 22 does not calculate the distance and attitude angle in step S05 in the current information process cycle (if NO in step S107), the procedure proceeds to step S111.

In step S109, the self-location calculation unit 26 sets the distance and attitude angle, which are calculated from the patterned light 32a in step S05 in the current information process cycle, as the starting points of the integration operation. In addition, the self-location calculation unit 26 sets the position of the vehicle, which is calculated together with the distance and attitude angle in the current information process cycle, as the starting point of the integration operation (the initial position of the vehicle).

In step S111, the self-location calculation unit 26 sets the distance and attitude angle, which are calculated from the patterned light 32a in step S05 in the previous information process cycle, as the starting points of the integration operation. In addition, the self-location calculation unit 26 sets the position of the vehicle, which is calculated together with the distance and attitude angle in the previous information process cycle, as the starting point of the integration operation (the initial position of the vehicle).

Once the starting points of the integration operation are set in this manner, the process in step S09 is terminated, and the procedure proceeds to step S11 shown in FIG. 8.

Effect of First Embodiment

As described in detail above, when determining that the vehicle 10 is the running stable state, the self-location calculating device of the embodiment calculates the current position of the vehicle 10 in present, as well as the current distance and attitude angle of the vehicle 10 in present relative to the road surface, by adding the amount of change in the attitude to the predetermined initial distance and initial attitude angle. This enables the self-location calculating device to reset the starting points for calculating the self-location of the vehicle 10 to the initial distance and initial attitude angle when the behavior of the vehicle 10 is stable. Accordingly, the self-location calculating device is capable of accurately calculating the self-location of the vehicle 10. Furthermore, since the self-location calculating device is capable of periodically resetting the starting points for calculating the self-location of the vehicle 10 to the initial distance and initial attitude angle, the self-location calculating device is capable of preventing the errors from being amplified.

In addition, since the self-location calculating device of the embodiment determines that the vehicle 10 is the running stable state when the vehicle 10 is at a stop, the self-location calculating device is capable of securely detecting that the behavior of the vehicle 10 is a stable state, and thereby capable of accurately calculating the self-location of the vehicle 10.

Furthermore, since the self-location calculating device of the embodiment determines that the vehicle 10 is the running stable state when the speed of the vehicle 10 is constant, the self-location calculating device is capable of securely detecting that the behavior of the vehicle 10 is the stable state, and thereby capable of accurately calculating the self-location of the vehicle 10.

Moreover, since the self-location calculating device of the embodiment determines that the vehicle 10 is the running stable state when the vehicle 10 is running straight, the self-location calculating device is capable of securely detecting that the behavior of the vehicle 10 is the stable state, and thereby capable of accurately calculating the self-location of the vehicle 10.

Besides, the self-location calculating device of the embodiment uses the distance and attitude angle of the vehicle 10 relative to the road surface at the time when the ignition switch of the vehicle 10 is turned on, as the predetermined initial distance and initial attitude angle. Thereby, the self-location calculating device is capable of representing the initial distance and initial attitude angle with values reflecting the occupants and payload of the vehicle 10, and thereby capable of more accurately calculating the self-location of the vehicle 10.

Second Embodiment

Next, referring to the drawings, descriptions will be provided for a self-location calculating device of a second embodiment of the present invention. It should be noted that the configuration of the self-location calculating device of the embodiment is the same as that of the first embodiment shown in FIG. 1. For this reason, detailed descriptions will be omitted.

[Information Process Cycle]

An information process cycle to be performed by the self-location calculating device of the embodiment is the same as that of the first embodiment shown in FIG. 8. For this reason, detailed descriptions for the information process cycle will be omitted. This embodiment is different from the first embodiment because of the process for setting the starting points of the integration operation in step S09 shown in FIG. 8.

[Process in Step S09]

Next, referring to a flow chart shown in FIG. 10, descriptions will be provided for a detailed procedure in step S09 shown in FIG. 8. In the foregoing first embodiment, it is determined in step S103 whether or not the vehicle 10 is the running stable state, and thereafter, it is determined in step S107 whether or not the distance and attitude angle are calculated from the patterned light 32a. In contrast, in this embodiment, as shown in FIG. 10, it is determined in step S203 whether or not the distance and attitude angle are calculated from the patterned light 32a, and thereafter, it is determined in step S205 whether or not the vehicle 10 is the running stable state.

Processes in the other steps S201 and S207 to S211 are the same as the processes in steps S101, S105, S109 and S111 in FIG. 9, respectively. For this reason, detailed descriptions will be omitted.

Effect of Second Embodiment

As described above, the self-location calculating device of the embodiment determines whether or not the vehicle 10 is the running stable state, only in a case where the distance and attitude angle of the vehicle 10 cannot be calculated from the patterned light 32a in the current information process cycle. This reduces the frequency at which the self-location calculating device performs the process of determining whether or not the vehicle 10 is the running stable state. Accordingly, it is possible to reduce the operation load of the ECU 13, and to increase the operation speed of the ECU 13.

It should be noted that the foregoing embodiments are examples of the present invention. For this reason, the present invention is not limited to the foregoing embodiments. It is a matter of course that: the present invention can be carried out in modes different from the foregoing embodiment; and according to designs, various modifications can be made to the present invention within a scope not departing from the technical idea of the present invention.

REFERENCE SIGNS LIST 10 vehicle
11 light projector
12 camera (image capturing unit)
13 ECU
21 patterned light extraction unit
22 attitude angle calculation unit
23 feature point detection unit
24 attitude change amount calculation unit
26 self-location calculation unit
27 patterned light control unit
30 running condition determination unit
31 road surface
32a, 32b patterned light
Te feature point

The invention claimed is:

1. A self-location calculating device comprising:
a light projector configured to project a patterned light onto a road surface around a vehicle;
an image capturing unit installed in the vehicle, and configured to capture and obtain an image of the road surface around the vehicle including an area onto which the patterned light is projected;
an attitude angle calculation unit configured to calculate an attitude angle of the vehicle relative to the road surface from a position of the patterned light on the image obtained by the image capturing unit;
an attitude change amount calculation unit configured to calculate an amount of change in an attitude of the vehicle based on temporal changes in a plurality of feature points on the road surface on the image obtained by the image capturing unit;
a self-location calculation unit configured to calculate a current position and a current attitude angle of the vehicle by adding the amount of change in the attitude to an initial position and the attitude angle of the vehicle; and
a running condition determination unit configured to detect a running condition of the vehicle, and to determine whether or not the vehicle is a running stable state, wherein
when the running condition determination unit determines that the vehicle is the running stable state, the self-location calculation unit calculates the current position and the current attitude angle of the vehicle by adding the amount of change in the attitude to a position and a predetermined initial attitude angle of the vehicle which is the running stable state.

2. The self-location calculating device according to claim 1, wherein when the vehicle is at a stop, the running condition determination unit determines that the vehicle is the running stable state.

3. The self-location calculating device according to claim 1, wherein when a speed of the vehicle is constant, the running condition determination unit determines that the vehicle is the running stable state.

4. The self-location calculating device according to claim 1, wherein when the vehicle is running straight, the running condition determination unit determines that the vehicle is the running stable state.

5. The self-location calculating device according to claim 1, wherein the self-location calculation unit uses the current position and the current attitude angle of the vehicle at a time when an ignition switch of the vehicle is turned on, as the predetermined initial attitude angle.

6. A self-location calculating method comprising:
a procedure of projecting a patterned light onto a road surface around a vehicle from a light projector installed in the vehicle;

a procedure of capturing and obtaining an image of the road surface around the vehicle including an area onto which the patterned light is projected, by an image capturing unit installed in the vehicle;

a procedure of calculating an attitude angle of the vehicle relative to the road surface from a position of the patterned light on the image in a control unit of the vehicle;

a procedure of calculating an amount of change in an attitude of the vehicle based on temporal changes in a plurality of feature points on the road surface on the image in the control unit;

a self-location calculating procedure of calculating a current position and a current attitude angle of the vehicle by adding the amount of change in the attitude to an initial position and the attitude angle of the vehicle in the control unit; and a running condition determining procedure of detecting a running condition of the vehicle, and determining whether or not the vehicle is a running stable state in the control unit, wherein when in the running condition determining procedure, it is determined that the vehicle is the running stable state, the current position and the current attitude angle of the vehicle are calculated in the self-location calculating procedure by adding the amount of change in the attitude to a position and a predetermined initial attitude angle of the vehicle which is the running stable state.

* * * * *